United States Patent [19]

Townsend

[11] Patent Number: 4,784,056
[45] Date of Patent: Nov. 15, 1988

[54] SAFETY DEVICE FOR MEAT SKINNING MACHINES

[75] Inventor: Ray T. Townsend, Des Moines, Iowa

[73] Assignee: Towsend Engineering Company, Des Moines, Iowa

[21] Appl. No.: 167,872

[22] Filed: Mar. 14, 1988

[51] Int. Cl.⁴ ............................................. A22C 7/12
[52] U.S. Cl. ....................................... 99/589; 17/21; 17/50; 99/584
[58] Field of Search .......... 99/588, 584, 589, 590–593, 99/492, 540, 567; 17/21, 50, 62

[56] References Cited

U.S. PATENT DOCUMENTS

| | | |
|---|---|---|
| 2,455,831 | 12/1948 | Townsend . |
| 3,324,915 | 6/1967 | Townsend . |
| 3,360,026 | 12/1967 | Schill . |
| 3,769,903 | 11/1973 | Greider ................................ 99/589 |
| 3,898,923 | 8/1975 | Greider ................................ 99/589 |
| 4,561,150 | 12/1985 | Townsend ............................. 17/50 |
| 4,670,943 | 6/1987 | Townsend ............................. 17/50 |

*Primary Examiner*—Timothy F. Simone
*Attorney, Agent, or Firm*—Zarley McKee, Thomte, Voorhees & Sease

[57] ABSTRACT

A safety device for meat skinning machines comprising an elongated bar mounted on the machine in close parallel spaced relation to the cutting edge of the cutting blade. The elongated bar has a straight support edge immediately opposite the cutting edge of the machine, with a plurality of substantially straight, stiff, spaced wire elements secured to the bar and extending from the support edge towards the cutting edge, with the wire elements having wire ends that terminate in spaced relation to the cutting edge.

17 Claims, 2 Drawing Sheets

U.S. Patent
Nov. 15, 1988
4,784,056
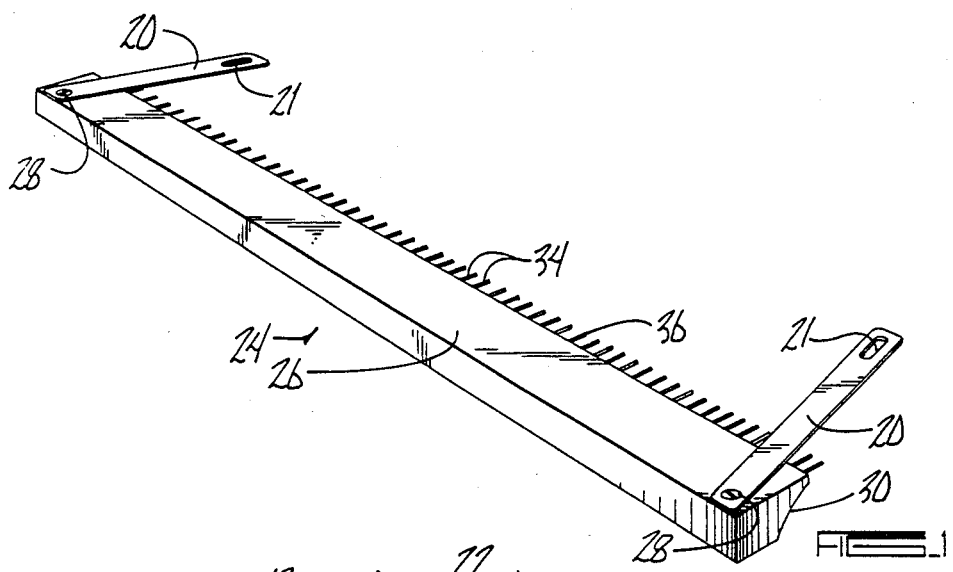
FIG_1
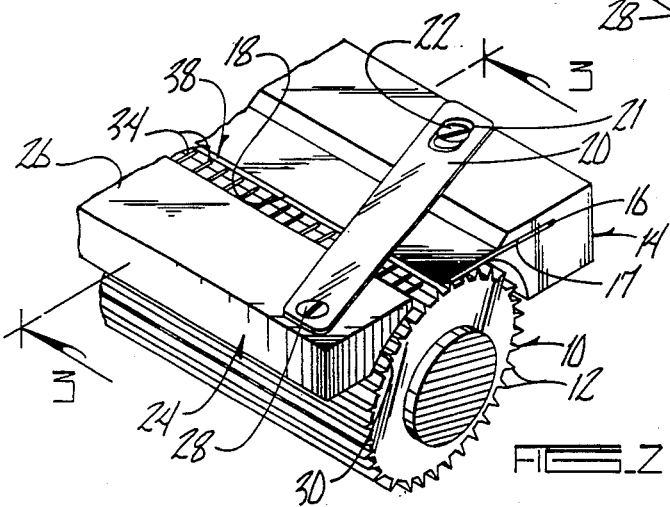
FIG_2
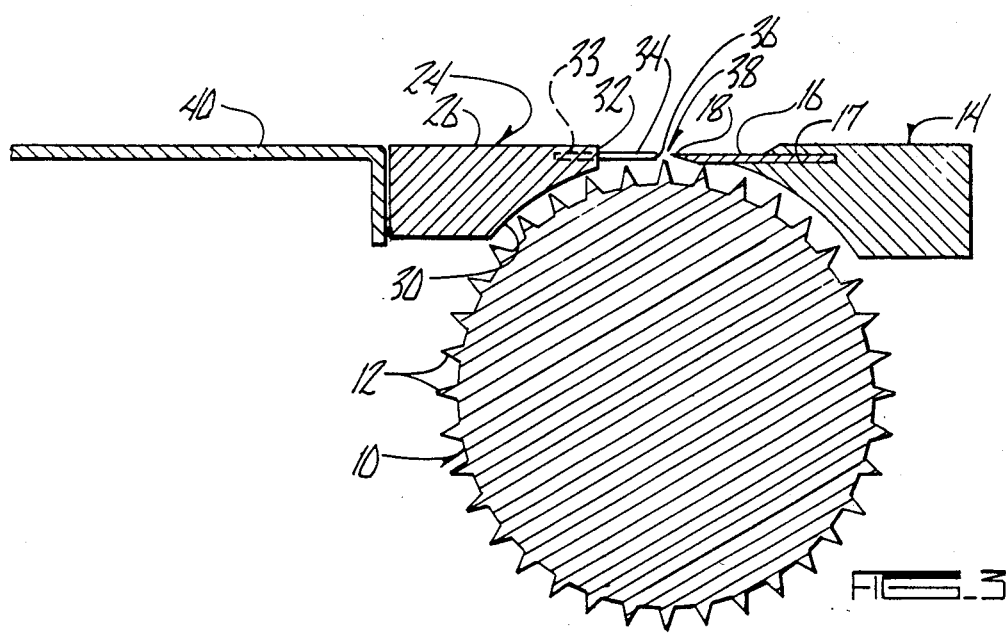
FIG_3

SAFETY DEVICE FOR MEAT SKINNING MACHINES

BACKGROUND OF THE INVENTION

Skinning machines comprising a frame, an elongated cutting blade, and a powered gripping roll for removing skin and membranes from meat, fish and poultry have long been available. In recent times, it has become common to separate the muscles in ham, remove the membranes between the muscles, and then re-unite the ham to create a composite ham without any internal membranes. This process often calls for small pieces of ham muscle to be manually moved into contact with the cutting blade and the gripping roll. The small size of these ham portions invite the likelihood that the fingers of the machine operator might be drawing into contact with the cutting blade.

Some prior skinning machines have provided means to resist the possibility of operator injury, but these devices also sometimes inhibit the skinning function, particularly, when the membranes are involved.

It is, therefore, a principal object of the invention to provide a safety device for meat skinning machines which will substantially impede the contact of the operator's fingers with the cutting blade while at the same time permitting the effective removal of skin or membrane from the meat product.

These and other objects will be apparent to those skilled in the art.

SUMMARY OF THE INVENTION

An elongated straight bar is mounted on the frame of a skinning machine on the upstream or inlet side of the cutting blade and gripping roll. The bar is positioned in close spaced parallel relation to the cutting edge of the cutting blades and has a straight support edge immediately opposite the cutting edge of the blade. A plurality of substantially straight, stiff, spaced wire elements are secured to the bar and extend from the support edge towards the cutting edge. The outer ends of the wires terminate in close spaced relation to the cutting edge with the space between the outer ends and the cutting edge permitting skin from a meat product to pass downwardly over the outer ends of the wires and underneath the blade.

BRIEF DESCRIPTION OF THE DRAWINGS

FIG. 1 is a perspective view of the safety device of this invention;

FIG. 2 is a partial perspective view of the safety device of FIG. 1 mounted on a meat skinning machine; and FIG. 3 is a sectional view taken through a meat skinning machine upon which the safety device of this invention has been mounted.

DETAILED DESCRIPTION OF THE PREFERRED EMBODIMENT

The term "meat" or "meat product" as used herein will be understood to include meat, poultry and fish products. The terms "skin" and "membrane" will be used synonymously herein, unless specifically designated otherwise.

With reference to FIG. 2, a powered skin-gripping roll 10 having a plurality of teeth 12 is mounted on the frame (not shown) of a conventional meat skinning machine. A shoe or blade-holder 14 is also mounted on the frame of the machine in close proximity to the periphery of the skin-gripping roll 10. An elongated straight cutting blade 16 is conventionally mounted within a slot 17 in the blade-holder 14. The blade 16 has a straight cutting edge 18 which dwells in close spaced relationship to the teeth 12 of the skin-gripping roll 10.

A pair of elongated brackets 20 are mounted by one of their ends to the top of blade-holder 14 by means of screws 12 which extend through elongated apertures 21 in the ends of each of the brackets. The screws are received within a suitable threaded aperture in the blade-holder 14. The brackets are located at the opposite ends of the blade-holder 14. They extend forwardly over the ends of blade 16 to support elongated bar 24. Bar 24 has a flat top 26. Screws 28 extend through suitable apertures in the forward ends of brackets 20 and are received in suitable threaded apertures within the ends of bar 24.

Bar 24 has an arcuate surface 30 which is complimentary in shape to the periphery of gripping roll 10. The upper portion of arcuate surface 30 terminates in a narrow vertical support surface 32 which normally is positioned in spaced relation directly opposite and in parallel fashion to the cutting edge 18 of blade 16.

A plurality of spaced apertures 33 are located in bar 24 and communicate with the vertical support surface 32. The longitudinal axes of the apertures 33 are substantially parallel to the flat top 26 of bar 24. Short, stiff and substantially straight wires 34 are mounted in each of the apertures 33 and are held in place either by friction or any convenient means. The outer ends 36 of wires 34 terminate in a straight line that is directly parallel to the cutting edge 18 of blade 16. As seen in FIG. 3, the wires are at or above the level of cutting edge 18, and never below. A space 38 is located between the outer ends 36 and the cutting edge 18 of the blade 16. A conventional conveyor surface or table 40 is mounted on the skinning machine frame to convey material to be skinned towards blade 16 and gripping roll 10.

While the dimensions of the bar 24, the wires 34, and their relative position with respect to the blade can be varied, it is preferred that the wires be 0.040 inches in diameter and that they be placed preferably 7/32 inches from center to center, and within a range of 5/32 to 8/32 inches. The space 38 between the outer ends of the wires and the cutting edge of the blade is preferably approximately 3/32 inches, and within a range of 3/32 to 5/32 inches.

In the normal operation of the device of this invention, it is preferred that the machine operator wear leather gloves of substantial thickness. It is preferred that the outer surface of the gloves have a roughened texture to facilitate the handling of the meat product.

Conventionally, the meat product to be skinned is moved on either a movable or stationary conveyor means 40 towards the cutting blade 16 and gripping roll 10. The meat product is moved across bar 24 and onto the protruding wires 34. The meat product is permitted to "droop" downwardly between the wires 34 to be engaged by the teeth 12 of the gripping roll 10. The circular cross-sectional shape of the wires 34 facilitates this drooping phenomenon. The membrane or skin to be removed is faced downwardly so that the teeth 12 actually engage the skin or membrane and pull the meat product towards the cutting edge 18 of blade 16. The membrane is then severed from the meat product and drawn underneath blade 16 and moves downwardly in a clockwise direction, as viewed in FIG. 3. The meat product with the membrane removed moves to the right, as viewed in FIG. 3, over the top of blade 16 and blade-holder 14.

The skinning phenomenon described above is essentially conventional in skinning machines of the prior art except that the wires 34 extending from the support surface 32 of bar 24 perform the very important function of allowing the meat product to droop therebetween for engagement with the gripping roll, while at the same time, preventing the operator's fingers from extending therebetween from being engaged by the gripping roll and pulled into engagement with the blade 16. The use of leather gloves by the operator is an added precaution to help effect the safe operation by the machine without injury to the operator's fingers.

Thus, it is seen that the device of this invention achieves at least its stated objectives.

I claim:

1. A skinning machine comprising a frame, a powered gripping roll having a plurality of gripping teeth rotatably mounted on said frame, a cutting blade having a cutting edge mounted on said frame with said cutting edge being closely spaced and parallel to said roll, the improvement comprising,
   a safety means on said machine to prevent a machine operator's fingers from engaging said cutting edge and gripping teeth, comprising,
   an elongated bar mounted on said machine in close spaced parallel relation to the cutting edge of said cutting blade,
   a straight support edge on said elongated bar immediately opposite said cutting edge,
   a plurality of substantially straight, stiff, spaced wire elements secured to said bar and extending from said support edge towards said cutting edge, said wire elements having outer ends that terminate in spaced relation to said cutting edge, the space between said outer ends and said cutting edge being sufficient to permit skin from a meat product to pass downwardly over said outer ends and underneath said blade, but preventing the fingers of a machine operator from being drawn into engagement with said blade.

2. The device of claim 1 wherein the space between said outer ends of said wire elements and said cutting edge is approximately 3/32 of an inch.

3. The device of claim 1 wherein said wire elements have a diameter of approximately 0.040 of an inch.

4. The device of claim 1 wherein said wire elements are spaced approximately 7/32 of an inch on centers.

5. The device of claim 2 wherein said wire elements are spaced approximately 7/32 of an inch on centers.

6. The device of claim 3 wherein said wire elements are spaced approximately 7/32 of an inch on centers.

7. The device of claim 1 wherein the space between said outer ends of said wire elements and said cutting edge is approximately 3/32 to 5/32 of an inch.

8. The device of claim 1 wherein said wire elements are spaced approximately 5/32 to 8/32 of an inch on centers.

9. The device of claim 2 wherein said wire elements are spaced approximately 5/32 to 8/32 of an inch on centers.

10. The device of claim 3 wherein said wire elements are spaced approximately 7/32 of an inch on centers.

11. A safety device for meat skinning machines to prevent the machine operator's fingers from being drawn into a straight blade cutting edge on such machine, and being adapted for mounting on front of and adjacent to said blade cutting edge, comprising,
    an elongated bar adapted to be mounted on a meat skinning machine immediately opposite the cutting edge of a meat skinning blade,
    a straight support edge on said elongated bar,
    a plurality of substantially straight stiff spaced wire elements secured to said bar and extending from said support edge, and
    means on said bar for attachment to a meat skinning machine.

12. The device of claim 11 wherein said wire elements have outer ends terminating in a straight common plane.

13. The device of claim 11 wherein said wire elements have a diameter of approximately 0.040 of an inch.

14. The device of claim 11 wherein said wire elements are spaced approximately 7/32 of an inch on centers.

15. The device of claim 13 wherein said wire elements are spaced approximately 7/32 of an inch on centers.

16. The device of claim 11 wherein said wire elements are spaced approximately 5/32 to 8/32 of an inch on centers.

17. The device of claim 13 wherein said wire elements are spaced approximately 5/32 to 8/32 of an inch on centers.

* * * * *